(12) United States Patent
Shimano et al.

(10) Patent No.: US 11,643,958 B2
(45) Date of Patent: May 9, 2023

(54) EXHAUST GAS PURIFICATION MATERIAL AND EXHAUST GAS PURIFICATION DEVICE

(71) Applicant: TOYOTA JIDOSHA KABUSHIKI KAISHA, Toyota (JP)

(72) Inventors: Norimichi Shimano, Toyota (JP); Taizo Yoshinaga, Susono (JP); Shogo Shirakawa, Toyota (JP); Nobuyuki Takagi, Toyota (JP); Masahide Miura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/656,266

(22) Filed: Mar. 24, 2022

(65) Prior Publication Data

US 2022/0307404 A1   Sep. 29, 2022

(30) Foreign Application Priority Data

Mar. 24, 2021   (JP) .............................. JP2021-050112

(51) Int. Cl.
| | |
|---|---|
| *F01N 3/28* | (2006.01) |
| *B01J 35/00* | (2006.01) |
| *B01J 37/02* | (2006.01) |
| *B01J 21/06* | (2006.01) |
| *B01J 23/46* | (2006.01) |
| *B01D 53/94* | (2006.01) |

(52) U.S. Cl.
CPC .............. *F01N 3/28* (2013.01); *B01D 53/94* (2013.01); *B01J 21/066* (2013.01); *B01J 23/464* (2013.01); *B01J 35/006* (2013.01); *B01J 37/02* (2013.01)

(58) Field of Classification Search
CPC ...... F01N 3/28; F01N 2370/02; B01J 21/066; B01J 23/464; B01J 21/04; B01J 35/0053; Y02T 10/12
USPC .......................................................... 422/177
See application file for complete search history.

(56) References Cited

U.S. PATENT DOCUMENTS

| | | | | |
|---|---|---|---|---|
| 6,475,951 | B1 * | 11/2002 | Domesle | ............ B01J 37/0248 502/328 |
| 2012/0329643 | A1 * | 12/2012 | Ogawa | ............... H01M 4/8814 502/355 |
| 2016/0068464 | A1 * | 3/2016 | Krill | ...................... C07C 67/39 560/208 |
| 2017/0151551 | A1 * | 6/2017 | Minami | .............. B01J 35/0013 |
| 2022/0062884 | A1 | 3/2022 | Chinzei et al. | |

FOREIGN PATENT DOCUMENTS

| | | |
|---|---|---|
| EP | 3932544 A1 | 1/2022 |
| JP | 2016147256 A | 8/2016 |
| JP | 2022-39147 A | 3/2022 |
| WO | 2020175142 A1 | 9/2020 |

* cited by examiner

*Primary Examiner* — Tom P Duong
(74) *Attorney, Agent, or Firm* — Dickinson Wright, PLLC

(57) ABSTRACT

The present disclosure provides an exhaust gas purification material and an exhaust gas purification device that can efficiently remove harmful components even after being exposed to high temperature. Such exhaust gas purification material comprises metal oxide particles and noble metal particles supported on the metal oxide particles. The noble metal particles have a particle size distribution with a mean of 1.5 nm and 18 nm and a standard deviation of less than 1.6 nm.

6 Claims, 1 Drawing Sheet

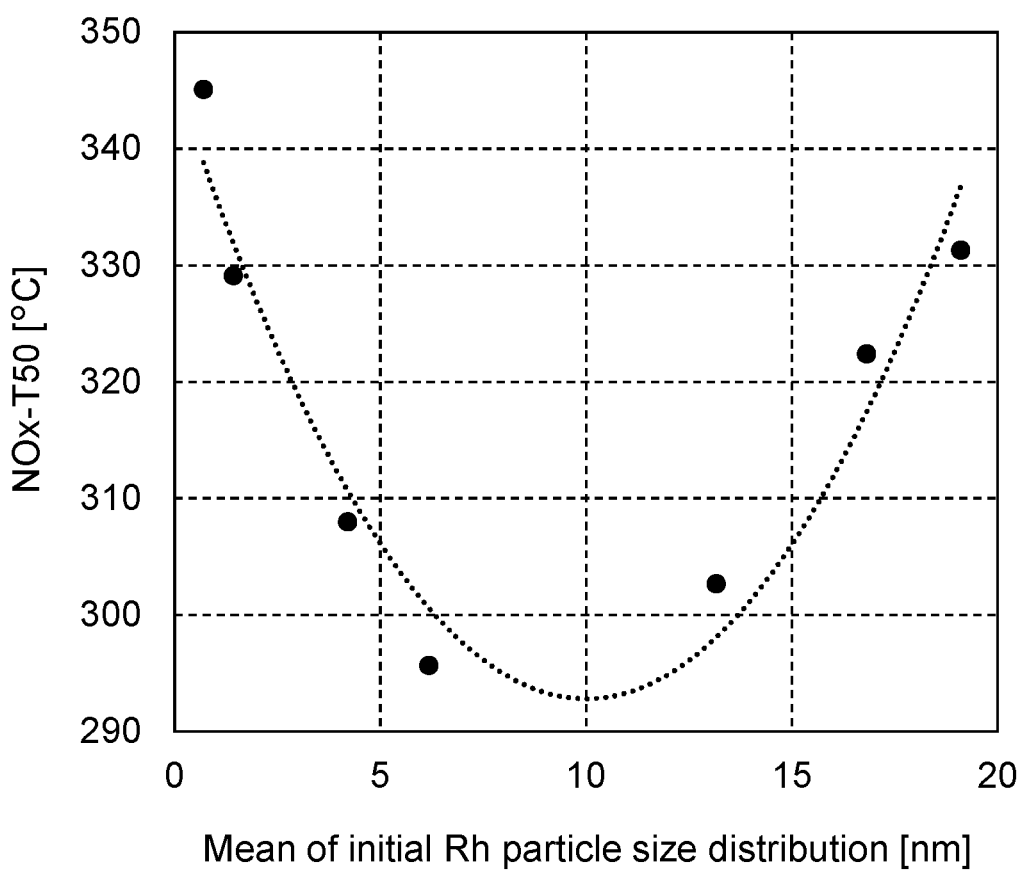

EXHAUST GAS PURIFICATION MATERIAL AND EXHAUST GAS PURIFICATION DEVICE

CROSS REFERENCE TO RELATED APPLICATIONS

The present application claims priority from Japanese patent application JP 2021-050112 filed on Mar. 24, 2021, the entire content of which is hereby incorporated by reference into this application.

BACKGROUND

Technical Field

The present disclosure relates to an exhaust gas purification material and an exhaust gas purification device.

Background Art

An exhaust gas discharged from an internal combustion engine used in a vehicle, such as an automobile, contains harmful components, such as carbon monoxide (CO), hydrocarbon (HC), and nitrogen oxide (NOx). Regulations on emission amounts of these harmful components have been tightened year by year. To remove these harmful components, noble metals, such as platinum (Pt), palladium (Pd), and rhodium (Rh), have been used as catalysts.

From the viewpoint of the resource risk, it has been desired to reduce the amount of the noble metals to be used. As a known method for reducing the amount of the noble metals to be used in an exhaust gas purification device, the noble metals are supported as fine particles on a carrier. For example, JP 2016-147256 A discloses a method for manufacturing a catalyst that includes a step of supporting noble metal particles on an oxide carrier to obtain a noble metal-supporting catalyst and a step of heating the noble metal-supporting catalyst in a reducing atmosphere to control a particle size of the noble metal in a predetermined range. WO 2020/175142 discloses supported catalyst particles comprising oxide carrier particles and noble metal particles supported on the oxide carrier particles, wherein the mass of the noble metal particles is less than or equal to 5% by mass based on the mass of the oxide carrier particles, the noble metal particles have an average particle size of 1.0 nm to 2.0 nm with standard deviation σ of 0.8 nm or less, as measured by observation with a transmission electron microscope.

SUMMARY

The noble metal particles disclosed in JP 2016-147256 and WO 2020/175142 were not sufficient in terms of durability at high temperature and such noble metal particles often exhibited lowered catalytic activity at high temperature.

Under the above circumstances, the present disclosure provides an exhaust gas purification material and an exhaust gas purification device that can efficiently remove harmful components even after being exposed to high temperature.

A first aspect of the present disclosure provides an exhaust gas purification material, comprising:
  metal oxide particles; and
  noble metal particles supported on the metal oxide particles,
wherein the noble metal particles have a particle size distribution with a mean of 1.5 nm to 18 nm and a standard deviation of less than 1.6 nm.

A second aspect of the present disclosure provides an exhaust gas purification device, comprising:
  a substrate; and
  the exhaust gas purification material of the first aspect provided on the substrate.

The exhaust gas purification material and the exhaust gas purification device according to the present disclosure can efficiently remove harmful components even after being exposed to high temperature.

BRIEF DESCRIPTION OF THE DRAWINGS

FIG. 1 shows a chart demonstrating the relationship between the mean of the initial Rh particle size distribution and NOx-T50 of the pellets prepared in Examples 1 to 4 and Comparative Examples 1 to 3.

DETAILED DESCRIPTION

Hereafter, embodiments of the present disclosure are described with reference to the drawing as necessary. In the drawing referred in the following description, the same reference numerals are applied to the same members or members having similar functions, and repeated descriptions thereof may be omitted in some cases. For convenience of explanation, a dimensional ratio in the drawing may differ from the actual ratio, and some members may be omitted in the drawing in some cases. In the present application, a numerical range expressed using the term "to" includes respective values described before and after the term "to" as the lower limit value and the upper limit value.

(1) Exhaust Gas Purification Material

The exhaust gas purification material according to the present embodiment comprises metal oxide particles and noble metal particles supported on the metal oxide particles.

Examples of the metal oxide particles include particles of oxides of one or more metals selected from the group consisting of metals of Group 3, Group 4, and Group 13 of the periodic table of elements and lanthanoid-based metals. When the metal oxide particles include two or more metal oxides, the metal oxide particles may be a mixture of two or more metal oxides, a composite oxide containing two or more metals, or a mixture of one or more metal oxides and one or more composite oxides.

For example, the metal oxide particles may be particles of oxide of one or more metals selected from the group consisting of scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). In some embodiments, the metal oxide particles may be particles of oxide of one or more metals selected from the group consisting of Y, La, Ce, Ti, Zr, and Al. In some other embodiments, the metal oxide particles may be particles of one or more metal oxides selected from the group consisting of alumina ($Al_2O_3$), ceria ($CeO_2$), and zirconia ($ZrO_2$); particles of composite oxide containing alumina, ceria, and zirconia; or particles of composite oxide containing alumina, ceria, zirconia, yttria ($Y_2O_3$), lanthanum ($La_2O_3$), and neodymium oxide ($Nd_2O_3$).

The metal oxide particles may function as oxygen storage capacity (OSC) materials that store oxygen in the atmosphere under the oxygen excess atmosphere and release oxygen under the oxygen deficient atmosphere.

The metal oxide particles may have any appropriate particle sizes.

The noble metal particles supported on the metal oxide particles function as catalysts that remove harmful components from exhaust gas. The noble metal particles may be particles of one or more metals selected from the group consisting of Pt, Pd, and Rh. In some embodiments, the noble metal particles may be Rh particles.

The noble metal particles have a particle size distribution with a mean within the range between 1.5 nm and 18 nm. The smaller the particle sizes of the noble metal particles are, in general, the higher the catalytic performance is due to the larger specific surface areas of the noble metal particles. However, excessively small particle sizes of the noble metal particles may cause coarsening of the noble metal particles through aggregation or the like at high temperature, which leads to deterioration of the catalytic performance. In the present embodiment, the mean of the particle size distribution of the noble metal particles is 1.5 nm or more, which allows controlled coarsening of the noble metal particles at high temperature, thereby controlling the deterioration of catalytic performance. In addition, the noble metal particles having the particle size distribution with the mean of 18 nm or less have sufficiently large specific surface areas. Thus, the noble metal particles can show high catalytic performance. The mean of the particle size distribution of the noble metal particles may be within the range between 3 nm and 17 nm or between 4 nm and 14 nm.

The particle size distribution of the noble metal particles has a standard deviation of less than 1.6 nm. The noble metal particles having the particle size distribution with the standard deviation of less than 1.6 nm allows efficient removal of harmful components even after being exposed to high temperature as described in the examples below. When the standard deviation of the particle size distribution of the noble metal particles is less than 1.6 nm, the number of coarse noble metal particles and the number of fine noble metal particles that can easily coarsen at high temperature are small. Thus, the noble metal particles can have sufficiently large specific surface areas after being exposed to high temperature, thereby showing high catalytic performance. The standard deviation of the particle size distribution of the noble metal particles may be 1 nm or less.

In the present application, the particle size distribution of the noble metal particles is the number-based particle size distribution determined by measuring projected area-equivalent diameters of 50 or more noble metal particles based on the image obtained with the transmission electron microscope (TEM).

The amount of the supported noble metal particles; i.e., the fraction of the noble metal particles based on the total weight of the metal oxide particles and the noble metal particles, may be within the range between 0.01% by weight and 2% by weight. When the fraction of the noble metal particles is 0.01% by weight or more, a sufficient amount of the noble metal particles is present, and harmful components can be thus removed from exhaust gas. When the fraction of the noble metal particles is 2% by weight or less, the density of the noble metal particles supported on the metal oxide particles is sufficiently sparse, which leads to controlled coarsening of the noble metal particles at high temperature. The fraction of the noble metal particles based on the total weight of the metal oxide particles and the noble metal particles may be within the range between 0.2% by weight and 1.8% by weight.

The noble metal particles may be supported on the metal oxide particles by any methods without any limitation. The noble metal particles can be supported on the metal oxide particles by, for example, mixing the metal oxide particles, a dispersion of the noble metal particles, and water, drying the resulting mixture, and sintering the resultant.

The dispersion of the noble metal particles can be prepared by, for example, dissolving a noble metal chloride and polyvinyl pyrrolidone in ethylene glycol, adding sodium hydroxide thereto, and heating the solution. The mean of the particle size distribution of the noble metal particles supported on the metal oxide particles can be modified by adjusting the amount of sodium hydroxide to be added.

The exhaust gas purification material according to the present embodiment may further contain other particles. Examples of other particles include particles that function as OSC materials. For example, ceria and composite oxides containing ceria (e.g., ceria-zirconia (CZ) composite oxide and alumina-ceria-zirconia (ACZ) composite oxide) can function as OSC materials. In some embodiments, CZ composite oxide may be used because of its high oxygen storage capacity and relatively low price. Composite oxide produced by further complexing CZ composite oxide with lanthanum, yttria, or the like can also be used as an OSC material.

An exhaust gas purification material may be powdery or may be shaped into any form, such as a pellet, by press molding or other methods.

(2) Exhaust Gas Purification Device

The exhaust gas purification material according to the embodiment above can be used for an exhaust gas purification device. An exhaust gas purification device comprises a substrate and an exhaust gas purification material provided on the substrate. The exhaust gas purification material may be provided on the substrate together with a binder, an additive, and/or other materials.

The substrate is not particularly limited. For example, a monolith substrate having a honeycomb shape can be used. The substrate may be formed of a ceramic material having high heat resistance, such as cordierite ($2MgO \cdot 2Al_2O_3 \cdot 5SiO_2$), alumina, zirconia, and silicon carbide, and a metal material formed of a foil of metal such as a stainless steel. In some embodiments, the substrate may be formed of a cordierite material for the purpose of minimizing cost.

When the substrate is a porous body having a plurality of pores, the exhaust gas purification material may be provided on inner surfaces defining the pores on the substrate. In the present application, "provided on the substrate" encompasses both of "provided on an outer surface of the substrate" and "provided on an inner surface of the substrate."

The exhaust gas purification material can be provided on the substrate by, for example, the following procedure. First, a slurry containing an exhaust gas purification material is prepared. The slurry may further contain a binder, an additive, and/or other substances. Properties of the slurry such as viscosity and particle sizes of solid components, may be appropriately adjusted. The prepared slurry is applied to a predetermined region of the substrate. For example, the predetermined region of the substrate is dipped in the slurry, and after a predetermined time has passed, the substrate is drawn from the slurry, thus the predetermined region of the substrate is coated with the slurry. Alternatively, the slurry may be applied to the substrate by pouring the slurry into the substrate and then blowing the substrate to spread the slurry. Subsequently, the slurry is dried and sintered at a predetermined temperature for a predetermined period of time. Thus, the exhaust gas purification material is provided on the substrate.

The exhaust gas purification device according to the present embodiment can be applied to various types of vehicles with internal combustion engines.

The embodiments of the present disclosure were described in detail above. It should be noted that the present disclosure is not limited to the embodiments described above and that various kinds of modifications in design can be made without departing from the spirit or scope of the claims of the present disclosure.

EXAMPLES

Hereafter, the present disclosure is specifically described with reference to the examples, but the present disclosure is not limited to the examples.

Example 1

(1) Preparation of samples

Polyvinyl pyrrolidone and rhodium chloride were dissolved in ethylene glycol. To the obtained solution, sodium hydroxide was added. The resulting solution was heated to 200° C. overnight. Thus, a dispersion of rhodium particles (an Rh particle dispersion) was obtained.

To distilled water, the Rh particle dispersion and composite oxide particles of $Al_2O_3$, $CeO_2$, $ZrO_2$, $La_2O_3$, $Y_2O_3$, and $Nd_2O_3$ (hereafter, referred to as "ACZ particles," as appropriate; the weight fraction of each component in the ACZ particles was: $Al_2O_3$: 30% by weight; $CeO_2$: 20% by weight; $ZrO_2$: 44% by weight; $La_2O_3$: 2% by weight; $Y_2O_3$: 2% by weight; $Nd_2O_3$: 2% by weight) were added, and the mixture was dried by heating while stirring. The resulting particles were allowed to stand in a dryer held at 120° C. for 2 hours for further drying, and the resultant was heated to 500° C. for sintering for 2 hours in an electric furnace.

The sintered particles were observed with the transmission electron microscope (TEM). It was thus confirmed that Rh particles were supported on the ACZ particles. In addition, the particle size distribution of the Rh particles (initial Rh particles) supported on the ACZ particles was determined on the basis of the TEM image. Table 1 shows the mean and the standard deviation of the initial Rh particle size distribution. The weight fraction of the Rh particles in the sintered particles (i.e., the weight fraction of the Rh particles based on the total weight of the ACZ particles and Rh particles) was as shown in Table 1.

To the sintered particles, the same weight of composite oxide particles of $CeO_2$ and $ZrO_2$ (hereafter, referred to as "CZ particles," as appropriate; the weight fraction of each component in the CZ particles: $CeO_2$: 46% by weight; $ZrO_2$: 54% by weight) was added, and the particles were grounded and mixed in a mortar. 2 g of powders were weighed from the resultant and then molded into pellets.

(2) Measurement of Average Rh Particle Size After Durability Test

The pellets were alternately exposed to a stoichiometric mixture of air and fuel (an air-fuel ratio A/F=14.6) and a mixture containing excess oxygen (lean; A/F>14.6) with a time ratio of 1:1 in a fixed cycle over the period of 5 hours while heated to 1,100° C. Thereafter, the average Rh particle size in the pellets was determined by the carbon monoxide pulse method. The result was as shown in Table 1.

(3) Evaluation of Exhaust Gas Purification Performance

After the durability test, the pellets were heated to 600° C. and maintained for 5 minutes while the gas with the composition shown in Table 2 was flowing around the pellets at a flow rate of 15 L/min, and the pellets were then cooled to 150° C. Thereafter, the pellets were heated to 600° C. at a rate of 20° C./min while maintaining the gas flow, and the temperature (referred to as "NOx-T50," as appropriate) of the pellets at the time when 50% of NOx had been removed from the gas was determined. The result was as shown in Table 1.

Comparative Example 1

Pellets were prepared in the same manner as in Example 1 except that an aqueous solution of rhodium nitrate was used instead of the Rh particle dispersion. The mean and the standard deviation of the initial Rh particle size distribution and the weight fraction of the Rh particles in the sintered particles were as shown in Table 1.

In the same manner as in Example 1, the average Rh particle size was measured after the durability test of the pellets, and the exhaust gas purification performance of the pellets was evaluated. The results were as shown in Table 1.

Comparative Example 2

Pellets were prepared in the same manner as in Example 1 except that an Rh particle dispersion prepared in the manner described below was used instead of the Rh particle dispersion prepared in Example 1. 0.2 g of rhodium (III) nitrate was dissolved in 50 mL of ion-exchange water to prepare an aqueous solution of rhodium nitrate (pH 1.0). Separately, a 175 g/L aqueous solution of tetraethylammonium hydroxide (pH 14) was prepared. With the use of a reactor (a microreactor) including two flat plates as clearance regulatory members, the aqueous solution of rhodium nitrate was allowed to react with the aqueous solution of tetraethylammonium hydroxide. Specifically, the aqueous solution of rhodium nitrate and the aqueous solution of tetraethylammonium hydroxide with a molar ratio of tetraethylammonium hydroxide to rhodium nitrate of 18:1 were introduced into the reaction field where the clearance was set at 10 μm to react with each other, thereby preparing an Rh particle dispersion. The resulting Rh particle dispersion had a pH of 14.

The mean and the standard deviation of the initial Rh particle size distribution and the weight fraction of the Rh particles in the sintered particles were as shown in Table 1.

In the same manner as in Example 1, the average Rh particle size was measured after the durability test of the pellets, and the exhaust gas purification performance of the pellets was evaluated. The results were as shown in Table 1.

Example 2

Pellets were prepared in the same manner as in Example 1 except that the amount of sodium hydroxide used to prepare the Rh particle dispersion was changed. The mean and the standard deviation of the initial Rh particle size distribution and the weight fraction of the Rh particles in the sintered particles were as shown in Table 1.

In the same manner as in Example 1, the average Rh particle size was measured after the durability test of the pellets, and the exhaust gas purification performance of the pellets was evaluated. The results were as shown in Table 1.

Examples 3 and 4 and Comparative Example 3

Pellets were prepared in the same manner as in Example 1 except that the amount of sodium hydroxide used to prepare the Rh particle dispersion was changed. The mean and the standard deviation of the initial Rh particle size distribution and the weight fraction of the Rh particles in the sintered particles were as shown in Table 1.

In the same manner as in Example 1, the exhaust gas purification performance of the pellets was evaluated. The result was as shown in Table 1.

Comparative Example 4

In the same manner as in Example 1, distilled water, the Rh particle dispersion, and the ACZ particles were mixed, and the resulting mixture was dried and sintered. The resulting particles were alternately exposed to the stoichiometric mixture of air and fuel (the air-fuel ratio A/F=14.6) and the mixture containing excess oxygen (lean; A/F>14.6) with a time ratio of 1:1 in a fixed cycle over the period of 5 hours while heated to 900° C.

Subsequently, the particles exposed to the mixture gas were observed with TEM. On the basis of the TEM image, the particle size distribution of the Rh particles (initial Rh particles) supported on the ACZ particles was determined. The mean and the standard deviation of the initial Rh particle size distribution were as shown in Table 1. The weight fraction of the Rh particles in the particles (i.e., the weight fraction of the Rh particles based on the total weight of the ACZ particles and Rh particles) was as shown in Table 1.

To the particles exposed to the mixture gas, the same weight of CZ particles was added, and the particles were grounded and mixed in a mortar. 2 g of powders were weighed from the resultant and then molded into pellets.

In the same manner as in Example 1, the exhaust gas purification performance of the pellets was evaluated. The result was as shown in Table 1.

Example 5

Pellets were prepared in the same manner as in Example 1 except that the mixing ratio of the Rh particle dispersion to the ACZ particles was changed. The mean and the standard deviation of the initial Rh particle size distribution and the weight fraction of the Rh particles in the sintered particles were as shown in Table 1.

In the same manner as in Example 1, the exhaust gas purification performance of the pellets was evaluated. The result was as shown in Table 1.

Comparative Example 5

Pellets were prepared in the same manner as in Comparative Example 2 except that the mixing ratio of the Rh particle dispersion to the ACZ particles was changed. The mean and the standard deviation of the initial Rh particle size distribution and the weight fraction of the Rh particles in the sintered particles were as shown in Table 1.

In the same manner as in Example 1, the exhaust gas purification performance of the pellets was evaluated. The result was as shown in Table 1.

FIG. 1 shows the relationship between the mean of the initial Rh particle size distribution and NOx-T50 in Examples 1 to 4 and Comparative Examples 1 to 3. NOx-T50 in each of Examples 1 to 4 in which the mean of the initial Rh particle size distribution was within the range between 1.5 nm and 18 nm was lower than NOx-T50 in Comparative Examples 1 to 3. This means that the pellets of Examples 1 to 4 had higher NOx reduction performance.

The results of measurement of the average Rh particle size after the durability test in Examples 1 and 2 and Comparative Examples 1 and 2 (see Table 1) showed that coarsening of the Rh particles during the durability test was controlled more efficiently in Examples 1 and 2 in which the mean of the initial Rh particle size distribution was 1.5 nm or more, than in Comparative Examples 1 and 2 in which the mean of the initial Rh particle size distribution was less than 1.5 nm. These results indicate that higher NOx reduction performance in Examples 1 to 4 was resulted from the controlled coarsening of the Rh particles due to the initial Rh particle size distribution with the mean of 1.5 nm or more. In Comparative Example 3 in which the mean of the initial Rh particle size distribution was more than 18 nm, the Rh particles had smaller specific surface areas even before the durability test, which would have resulted in deteriorated NOx reduction performance.

In Comparative Example 4, the mean of the initial Rh particle size distribution was within the range between 1.5 nm and 18 nm as with the cases of Examples 1 to 4; however, the standard deviation of the initial Rh particle size distribution was 1.6 nm or more, which was higher than that in Examples 1 to 4 (see Table 1). This indicates that the pellets of Comparative Example 4 contained a greater amount of fine Rh particles compared with the pellets of Examples 1 to 4. It is considered that, in Comparative Example 4, the fine Rh particles coarsened during the durability test, and specific surface areas of the Rh particles thus became smaller than those in Examples 1 to 4 after the durability test, resulting in NOx reduction performance lower than that in Examples 1 to 4.

The pellets of Example 5 in which the mean of the initial Rh particle size distribution is within the range between 1.5 nm and 18 nm resulted in lower NOx-T50 (i.e., higher NOx reduction performance) than that resulted from the pellets of Comparative Example 5 in which the mean of the initial Rh particle size distribution is less than 1.5 nm. A difference in NOx reduction performance between Example 5 and Comparative Example 5 was smaller than that between Example 1 and Comparative Example 2. This indicates the following. When the weight fraction of the Rh particles in the sintered particles is between 0.01% by weight and 2% by weight or between 0.2% by weight and 1.8% by weight, the mean of the initial Rh particle size distribution of 1.5 nm or more leads to sufficiently enhanced NOx reduction performance. When the weight fraction of the Rh particles in the sintered particles is further increased (e.g., the weight fraction of Rh particles is over 2% by weight), on the other hand, the mean of the initial Rh particle size distribution of 1.5 nm or more cannot necessarily lead to sufficiently improved NOx reduction performance.

TABLE 1

| | Fraction of Rh particles in sintered particles (wt %) | Mean of initial Rh particle size distribution (nm) | Standard deviation of initial Rh particle size distribution (nm) | Average Rh particle size after durability test (nm) | NOx-T50 (° C.) |
|---|---|---|---|---|---|
| Ex. 1 | 0.2 | 6.17 | 0.89 | 9.01 | 295.7 |
| Comp. Ex. 1 | 0.2 | 0.70 | 0.41 | 12.41 | 345.1 |
| Comp. Ex. 2 | 0.2 | 1.42 | 0.48 | 10.82 | 329.1 |
| Ex. 2 | 0.2 | 4.20 | 0.74 | 9.39 | 308.0 |
| Ex. 3 | 0.2 | 13.16 | 1.31 | | 302.7 |
| Ex. 4 | 0.2 | 16.81 | 1.53 | | 322.4 |
| Comp. Ex. 3 | 0.2 | 19.1 | 1.55 | | 331.3 |
| Comp. Ex. 4 | 0.2 | 5.64 | 1.61 | | 332.5 |
| Ex. 5 | 1.8 | 6.31 | 0.94 | | 235.6 |
| Comp. Ex. 5 | 1.8 | 1.48 | 0.51 | | 237.4 |

TABLE 2

| Component | Fraction |
|---|---|
| CO | 0.52 vol % |
| $O_2$ | 0.50 vol % |
| $C_3H_6$ | 3,000 ppmC |
| NO | 0.32 vol % |
| $CO_2$ | 14 vol % |
| $H_2$ | 3 vol % |
| $N_2$ | Balance |

What is claimed is:

1. An exhaust gas purification material, comprising:
   metal oxide particles; and
   noble metal particles supported on the metal oxide particles,
   wherein the noble metal particles have a particle size distribution with a mean of 6.17 nm to 17 nm and a standard deviation of less than 1.6 nm.

2. The exhaust gas purification material according to claim 1, wherein the weight fraction of the noble metal particles is 0.01% to 2% by weight based on the total weight of the metal oxide particles and the noble metal particles.

3. The exhaust gas purification material according to claim 1, wherein the metal oxide particles are particles of one or more oxides selected from the group consisting of alumina, ceria, and zirconia.

4. The exhaust gas purification material according to claim 1, wherein the noble metal particles are rhodium particles.

5. An exhaust gas purification device, comprising:
   a substrate; and
   the exhaust gas purification material according to claim 1 provided on the substrate.

6. The exhaust gas purification material according to claim 1, wherein the weight fraction of the noble metal particles is greater than or equal to 0.01% by weight and less than 1.8% by weight based on the total weight of the metal oxide particles and the noble metal particles.

* * * * *